United States Patent [19]

Röhm

[11] Patent Number: 4,773,657
[45] Date of Patent: Sep. 27, 1988

[54] DRILL APPARATUS

[76] Inventor: Günter H. Röhm, Heinrich-Röhm-Str. 50, 7927 Sontheim, Fed. Rep. of Germany

[21] Appl. No.: 744,795

[22] Filed: Jun. 13, 1985

[30] Foreign Application Priority Data

Jun. 15, 1984 [DE] Fed. Rep. of Germany ....... 3422195
Jun. 16, 1984 [DE] Fed. Rep. of Germany ....... 3422539

[51] Int. Cl.$^4$ ............................................. B23B 5/22
[52] U.S. Cl. ................................. 279/19.1; 279/19.2
[58] Field of Search .................. 279/19.1, 19.2, 19.3, 279/19.4, 19.5

[56] References Cited

U.S. PATENT DOCUMENTS 2,262,849  11/1941  Knecht ............................. 279/1 F
4,381,116   4/1983  Futter ................................. 279/62

FOREIGN PATENT DOCUMENTS 2157217  10/1985  United Kingdom ............... 279/19.3

Primary Examiner—Frank T. Yost
Assistant Examiner—Willmon Fridie, Jr.
Attorney, Agent, or Firm—Herbert Dubno; Ronald Lianides

[57] ABSTRACT

The drill chuck body is connected to a drill spindle, and chuck jaws forming a retention for the drill tool can be adjusted by turning a control ring. A lock sleeve serves to secure the control ring whereby the lock sleeve, in the direction of shifting, is maintained against the control ring under the force of a spring. At least one contact head is provided at the chuck body. The contact head reaches into a recess in the wall of the lock sleeve. Each recess is formed by two axial grooves which extend adjacent to one another, but which have different lengths, and which are open at the end which is directed towards the control ring for the entry of the respective contact head. The lock sleeve can be turned on the chuck body to such an extent that either one or the other of the two grooves is axially aligned with the contact head. The contact head is extended in the longitudinal direction of the grooves to provide contact surfaces for the lateral walls of the grooves.

12 Claims, 2 Drawing Sheets

DRILL APPARATUS

FIELD OF THE INVENTION

My present invention relates to a drill chuck and, more particularly, to a drill chuck for an impact drill which has a locking sleeve adapted to prevent undesired opening of the chuck by locking of the jaw-actuating ring.

BACKGROUND OF THE INVENTION

A drill chuck can have a chuck body which can be driven by the drill spindle. The chuck jaws are guided in the chuck body, and they provide a retention means for the respective drilling tool. These jaws are adjustable by way of a control ring which can be rotated with respect to the chuck body, and which, furthermore, is guided so that it cannot be shifted or displaced in axial direction.

The apparatus can also include a lock sleeve which can be axially shifted with respect to the chuck body, and the position of the lock sleeve can be fixed in the direction of this axial movement or shifting movement. The lock sleeve secures the control ring and, accordingly, is spring biased in the displacement direction and against the control ring.

The drill chuck can have an axial passage which merges into the retainer for the drill tool. The impact action arising during the drilling, or during percussion drilling, is then directly transferable through this axial passage from the drill spindle to the drilling tool which is held with its respective end by the chuck jaws.

It is known, for example, from German Utility Model DE-GM No. 83 27 665, that an aperture in the drill chuck of this type can be formed by a slot in the wall of the lock sleeve, and an abutment head formed by the end of a pin of circular cross section extends radially into the aperture of the chuck body. When the pin contacts the lateral walls of the slot with its end, the lock sleeve is prevented from turning at the chuck body.

Furthermore, the lock sleeve is positioned so that it can be axially shifted between two positions, and it is provided at its end which is facing the control ring with teeth which are associated with opposite or complimentary teeth at the control ring.

When the lock sleeve is moved into the position against the control ring, the teeth of the lock sleeve engage in the opposite teeth and, accordingly, lock the control ring against undesired turning as, for example, from the impact action.

When the lock sleeve is moved away from the control ring, against the force of the spring, the teeth of the lock sleeve, however, are disengaged from the adjacent teeth of the control ring so that the control ring can be turned as desired.

However, manipulation is complicated when the lock sleeve is not engaged with the control ring.

To preclude rotation of the control ring is, however, particularly of importance with percussion tools because this will prevent that the drill chuck, during impact percussion operation, from working itself loose by itself. Another problem is excessive tensioning such that axial movement or shifting, which is per se desired, of the drilling tool in the retainer formed by the chuck jaws may be lost, and/or the chuck tightened to such an extent that it could be opened only with difficulty for replacing the drill.

The forces acting in the circumferential direction of the lock sleeve are correspondingly large, and these forces are taken up through the contact of the lateral walls of the slot at the pin end.

This abutment or contact is substantially linear so that a high specific wear of the respective material of construction occurs at the lateral wall of the slot and also at the end of the pin. Such excessive wear can easily lead to permanent deformations at the lateral wall of the slot and the end of the pin which, in the final analysis, can lead to permanent damage of the drill chuck.

OBJECTS OF THE INVENTION

It is, accordingly, an object of my invention to provide a drill chuck of the type mentioned in which the lock sleeve can be fixed in a simple manner with respect to the control ring.

It is also an object of the invention to ensure that the contact head and the walls of the recess on which the contact head comes to rest can withstand even such large loads as are experienced in impact percussion operation, and substantially without the danger of permanent or material damage.

SUMMARY OF THE INVENTION

The above and other objects are attained in accordance with the invention in that the groove or aperture in the wall of the lock sleeve is formed by two axial grooves which extend adjacent to one another, but which each have a distinct and different length. The grooves are respectively open at the end which is directed towards the control ring, for the entry of the contact or abutment head. Also, the lock sleeve can be turned on the chuck body to such an extent that selectively each of the two grooves is axially aligned with the abutment head.

According to a feature of the invention the contact head is extended in the longitudinal direction of the grooves in the manner of a rib, leg or similar member, and the longitudinal sides of this element form contact surfaces for contacting, or impacting on, the lateral walls of the grooves.

With the system of the invention the lock sleeve is positionally fixed with respect to the control ring in the disengaged condition when the contact head is positioned in the shorter groove. Additionally, the contact head is equipped with a large surface area, due to its longitudinal leg sides, which can contact or impact at the lateral walls of the groove. Thus, even when experiencing large forces, which are to be transferred between the contact head and the lock sleeve, the specific area loads are so small that permanent material damage can be assuredly avoided.

In a preferred embodiment the contact head is formed by the end of a pin which is radially inserted into a bore of the chuck body and which anchors the contact head at the chuck body.

For preventing radial movement out of the chuck body, the pin is secured by the contact head abutting at the bottom of the grooves.

It is also preferred that the contact head at its drill-side end has a planar end surface with which it can be positioned on a shoulder of the chuck body so as to preclude rotation and, in the result, the contact head cannot rotate with respect to, or about, the central longitudinal axis of the pin forming the contact head.

When the contact head is in the shorter of the two grooves, the lock sleeve, under the force of the spring, is abutting with the forward groove end at the abutment head in such a position that the lock sleeve is disengaged from the control ring.

The longer of the two grooves, however, is dimensioned in such a way that the lock sleeve can engage the control ring, to effect the desired securement action, and the contact head located in the longer groove then only precludes turning of the lock sleeve, but not its axial positioning.

Accordingly, the longer of the two grooves can also be axially open at both ends. This is of advantage for a more simple assembly.

In order to reduce as much as possible the distance of axial shifting of the lock sleeve, which is required for transfer of the contact head between the two grooves, in accordance with another preferred embodiment of the invention, the grooves can be provided with a free transverse connection on the drill-bit side and the height of this connection, in the longitudinal direction of the grooves, is less than the axial height of the contact head.

The parts of the outer side wall of both grooves which are positioned on both sides of the transverse connection form at the same time stops for the contact head which limit the rotational range of the lock sleeve for the contact head.

BRIEF DESCRIPTION OF THE DRAWING

The above and other objects, features and advantages will become apparent from the following description, reference being made to the accompanying drawing in which.

SPECIFIC DESCRIPTION

Figure 1:
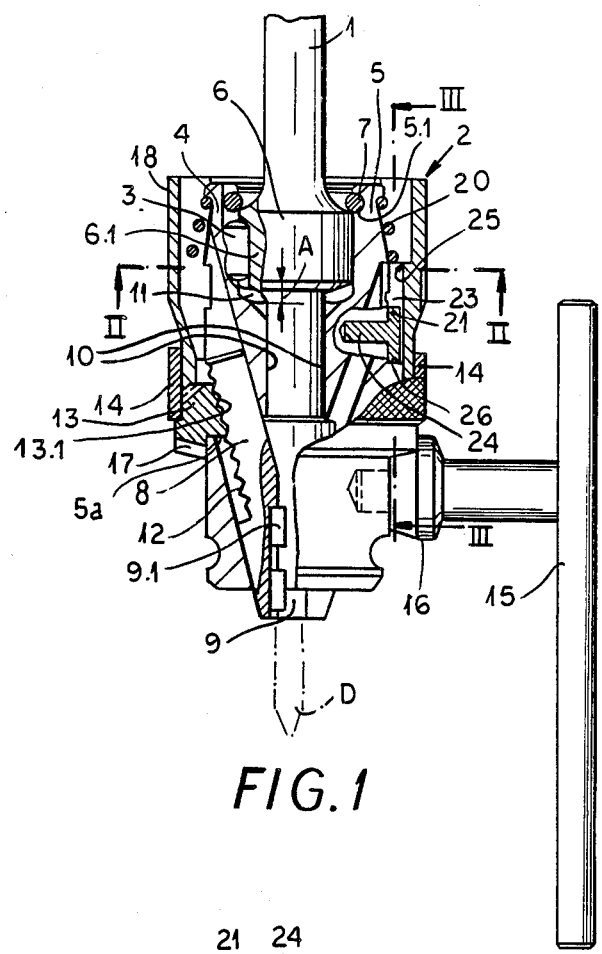
FIG. 1 is an axial cross-section through the drill chuck according to the invention.
Figure 2:
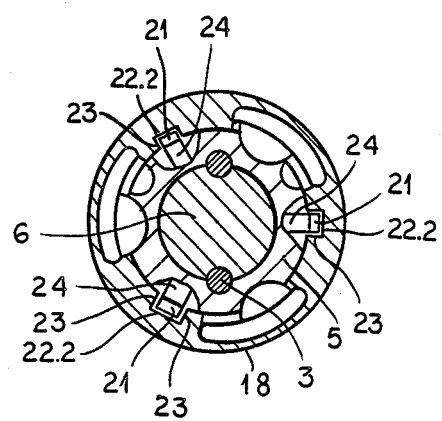
FIG. 2 is a cross section along line II—II through the drill chuck according to FIG. 1.

A drill spindle 1 (FIG. 1) carries the drill chuck 2, which is driven by the drill spindle 1.

The drill chuck 2 is mounted on the drill spindle 1 so as to rotate therewith. Thus, two pins 3 are provided which allow axial shifting or displacement of the drill chuck 2 on the drill spindle 1 because the associated grooves 4 in the chuck body 5 are axially longer than the pins 3, i.e. they extend in upward direction to the mouth of the chuck body 5.

The pins 3 are provided in openings 6.1 of a spindle collar 6. The drill chuck 2 is secured at the spindle collar 6 by means of a spring ring 7, or similar resilient fastener, which can be positioned in an annular groove 5.1 in the chuck body 5. The spring ring 7 reaches behind, or extends in such a way at the spindle collar 6 and such that it provides an abutment or similar stop for the axial, upward movement of the collar 6 and, accordingly, also for the spindle 1.

Several chuck jaws 8 are centrically adjustable in the chuck body 5 and, in assembly these form a retainer 9 for the drill tool D. A central axial passage 10 is provided in the chuck body 5, and the axial passage 10 merges into, or forms an extension of the retainer 9, but it is generally of smaller diameter. As shown in the drawing, the spindle 1 extends through the passage 10 to impact on the end of the drill bit. However, in other embodiments this passage or bore can be provided for a central shaft which is provided in a hollow drill spindle. In any event, the impact or percussion movement and the impact effect are directly transferred from the drill spindle 1 to the end of the drill or tool D which is held in the retainer 9 between the chuck jaws 8.

The spindle collar 6 can axially move to some extent in two directions, i.e. up or down through the distance 'A' (FIG. 1), in the cylindrical cavity 11. Thus, the cavity 11 has an inner diameter which generally corresponds to the outer diameter of the collar 6. Due to the generally small free play or axial shifting ('A') of the collar 6, the chuck body 5, and with it the chuck 2, is maintained to be disengaged from, or similarly unaffected by, the impact effect of the drill spindle 1.

The chuck jaws 8 are formed with external screw threads 12, or similar formations, adapted to engage in matching (complementary) formations or internal screw threads 13.1 of a control ring 13. This control ring 13 is guided in an annular groove 5a of the chuck body 5, but it is otherwise allowed to rotate as required. In order to be properly located in the annular groove, the control ring 13 is divided in transverse direction. The two rin portions are then held together by an outer control sleeve 14 which is axially moved by the control ring 13 engaging in a groove 5b.

The control ring 13 can be moved manually and by way of a tightening key 15 which can be applied at the chuck body 5, particularly with a conical gear or similar formation 16 which meshingly cooperates with a lower toothed rim or similar formation 17 of the control ring 13.

A lock sleeve 18 is mounted on the chuck body 5, which lock sleeve 18 is guided so as to be axially movable, but which can also be fixed in the direction of rotation. In the rim which is directed towards the control ring 13, the lock sleeve 18 has teeth or similar formations 19, and these can meshingly cooperate with opposite upper teeth 13.2 at the control ring 13.

In the position shown in the drawing, which is achieved by the force of a spring 20 biasing the sleeve is toward the control ring 13, the teeth 19 of the lock sleeve 18 engage in the opposite teeth 13.2 of the control ring 13 and, accordingly, turning or rotation of the control ring 13 can be precluded.

In order to resume turning of the control ring 13, the lock sleeve 18 is axially moved backwards (upwardly in FIG. 1), against the force of spring 20, so that the teeth 19 of the lock sleeve 18 are disengaged from the upper teeth 13.2 at the control ring 13.

Holding of the lock sleeve 18 in this rearward or disengaged position and to prevent in any case the rotating movement, three abutment or contact heads 21 are provided at the chuck body 5 and which respectively are adapted to be inserted in openings in the wall of the lock sleeve 18.

Each one of these openings is formed by two axial grooves 22.1 and 22.2 which extend adjacent to one another, but a groove 22.2 is longer than a groove 22.1. Also, the longer groove 22.2 is axially open at both ends. A respective groove pair can be accessed by a respective abutment head 21 from below, i.e. from the direction of the control ring 13. For selective entry into one of the grooves 22.1 and 22.2, the lock sleeve 18 can be rotated on the chuck body 5 to such an extent that either one or the other of the grooves 22.1 and 22.2 is axially aligned with the respective contact or abutment head 21.

Each abutment head 21, in turn, is extended in the longitudinal direction of the grooves 22.1, 22.2, extended by way of a leg, say a T-bar or similar element, and the longitudinal leg sides 21.1 provide abutment surfaces for the lateral groove walls 23, i.e. ultimately stops for the lock sleeve 18. In other words, the leg sides 21.1 can be contacted by the lateral walls 23 of the grooves. In greater detail, each abutment head 21 is formed by the end of a pin 24 which is radially inserted into a bore in the chuck body 5 and which anchors the abutment head 21 at the chuck body 5. Radially in the outer direction, the abutment head 21 is secured by being in contact at the bottom 25 of the grooves 22.1 and 22.2 in the wall of the lock sleeve 18. To ensure that a respective abutment head 21 does not rotate or turn, each abutment head 21 has a planar end surface 21.2 at the drill-side end with which a respective abutment head 21 is positioned roration-fast on a shoulder 26 of the chuck body 5.

Furthermore, the grooves 22.1 and 22.2 are provided with a free transverse connection 27 the height of which in longitudinal direction of the grooves 22.1 and 22.2 is less than the length of the leg of each abutment head 21. The connection 27 is located at the drill-side ends of the grooves 22.1 and 22.2.

The wall portions or parts 28 positioned on both sides of the transverse connection 27 of the outer lateral walls 23 of both grooves 22.1 and 22.2 form stops for the abutment head 21 and, accordingly, limit the range of rotation of the lock sleeve 18.

In the condition shown in the drawing, the spring 20 presses the lock sleeve 18, without being obstructed by the abutment head 21, axially against the control ring 13. Accordingly, the teeth 19 of the lock sleeve 18 and the opposite teeth 13.2 of the control ring 13 engage meshingly with one another.

When the abutment heads 21 are positioned in the longer grooves 22.2 they secure the lock sleeve 18 and, accordingly, also the control ring 13 against rotation.

Figure 3:
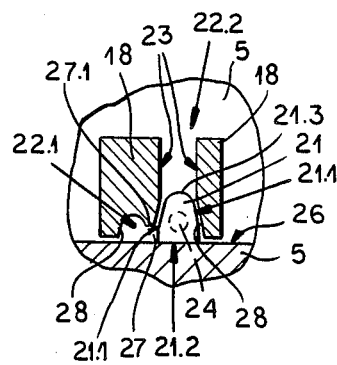
FIG. 3 is a partial exploded section in the direction of line III—III through the drill chuck in FIG. 1.
Figure 4:
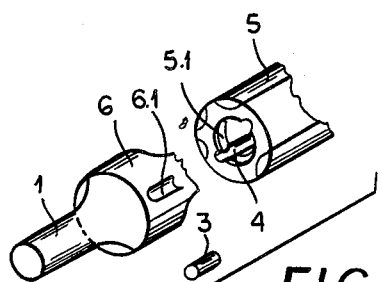
FIG. 4 is a diagrammatic exploded perspective view of the connection between the drill shaft and the drill spindle.
Figure 5:
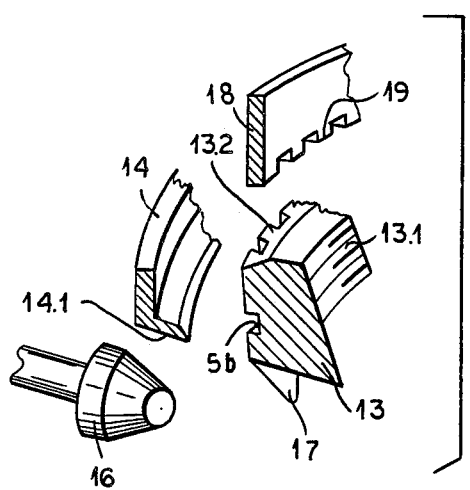
FIG. 5 is an diagrammatic exploded perspective view of the connection between the control sleeve, the associated control ring, and the lock sleeve.

When the lock sleeve 18 is moved backwards, i.e. in upward direction in FIG. 1, against the pressure of the spring 20, the upper end 27.1, see FIG. 3, of the free transverse connection 27 is positioned above the upper rounded end 21.3 of the abutment head 21 and, accordingly, the lock sleeve 18 can be rotated. This rotation can be carried out to such an extent that the shorter groove 22.1 is aligned with the abutment head 21, and the abutment head 21 enters in axial direction into the shorter groove 22.1 upon release of the lock sleeve 18 and moves forward, i.e. downward in FIG. 1, due to the force of the spring 20.

However, the advancing movement is already terminated when the upper groove end is abutting at the abutment head 21 in a position in which the lock sleeve 18 is still not engaged at the control ring 13.

In order to facilitate the running-in of the abutment head 21 into the respectively new groove during the movement thereof from one to the other, the lateral walls 23 of the grooves at the drill-side end of the grooves 22.1 and 22.2 are flared to be separated from one another in the fashion of a wedge, and thereby form captivating inclined guide surfaces for the abutment head 21. Also at the abutment head 21 itself, the longitudinal sides 21.1 thereof can be correspondingly inclined so as to ensure at any location an overall contact of the abutment head 21 at the lateral walls 23 of the grooves.

Such embodiment of the abutment head 21 simultaneously increases the size of the end surface 21.2 seated on the shoulder 26 and, accordingly, improves the securement against rotation for the abutment head 21.

It will be obvious that the two ring portions of the control ring 13 can be provided with a receiving and retaining groove 5b or similar formation for a corresponding lip 14.1 on the outer control sleeve 14.

The description has referred to a controllable connection for the lock sleeve 18 which can be axially repositioned such that its teeth 19 are disengaged from the matching teeth 13.2 of the control ring 13. The lock sleeve 18 can also be turned and this is controlled by cam-like formations formed by several grooves in the wall of the lock sleeve 18, and these cam formations serve to guide three control or abutment heads 21 in accordance with their curvature.

The drill D may be additionally retained by way of friction pads 9.1 or similar means.

I claim:

1. A drill chuck comprising:
    a drill spindle;
    a chuck body connected to said spindle;
    a plurality of chuck jaws movably guided in said chuck body for retention of a drill tool;
    a control ring mounted on said body for rotation relative to said body but constrained aganist movement in an axial direction, said control ring having axially directed formations;
    at least one contact head arranged on said chuck body;
    a locking sleeve mounted on said chuck body, said locking sleeve being axially shiftable and having at least limited rotatablility with respect to said body, said locking sleeve being formed with axially directed formations engageable with the formations of said control ring for securing said control ring against rotation;
    two axial grooves formed in said sleeve and extending adjacent to one another, but of different lengths, at an end of said sleeve turned towards said control ring for receiving said contact head, whereby said lock sleeve can be turned on the chuck body to such an extent that either one or another of said grooves is axially with said at least one contact head; and
    means for resiliently biasing said lock sleeve in the directions of shifting against said control ring.

2. The drill chuck defined in claim 1 wherein said contact head is elongate in the longitudinal direction of said grooves, and wherein edges of said head form contact surfaces for respective lateral walls of said grooves.

3. The drill chuck defined in claim 2 wherein said grooves have groove side walls which diverge toward said ring for engagement with inclined guide surface of said contact head, and wherein said contact head is formed with correspondingly inclined longitudinal sides.

4. The drill chuck defined in claim 1 wherein said at least one contact head is formed by an end of a pin member which is radially received in said chuck body, and which anchors said contact head at said chuck body.

5. The drill chuck defined in claim 1 wherein the longer one of said grooves is axially open in both directions.

6. The drill chuck defined in claim 1 with at least three contact heads and at least three cam formation recesses.

7. The drill chuck defined in claim 1 wherein said body has an axial passage receiving said tool, an impact effect generated during percussion drilling being directly transferred from said drill spindle to said tool.

8. The drill apparatus according to claim 1 wherein said control ring is split into two parts held together by a control sleeve.

9. A drill chuck comprising:
a drill spindle;
a chuck body connected to said spindle;
a plurality of chuck jaws movably guided in said chuck body for retention of a drill tool;
a control ring mounted on said body for rotation relative to said body but constrained against movement in an axial direction, said control ring having axially directed formations;
at least one contact head arranged on said chuck body;
a locking sleeve mounted on said chuck body, said locking sleeve being axially shiftable and having at least limited rottablility with respect to said body, said locking sleeve being formed with axially directed formations engagable with the formations of said control ring for securing said control ring against rotation;
two axial grooves formed in said sleeve and extending adjacent to one another, but of different lengths, at an end of said sleeve turned towards said control ring for receiving said contact head, whereby said lock sleeve can be turned on the chuck body to such an extent that either one or another of said grooves is axially aligned with said at least one contact head;
means for resiliently biasing said lock sleeve in the direction of shifting against said control ring; and
wherein said chuck body has a shoulder, and said contact head has a planar surface engaging said shoulder so as to preclude said head from being turned.

10. A drill chuck comprising:
a drill chuck comprising:
a drill spindle;
a chuck body connected to said spindle;
a plurality of chuck jaws movably guided in said chuck body for retention of a drill tool;
a control ring mounted on said body for rotation relative to said body but constrained against movement in an axial direction, said control ring having axially directed formation;
at least one contact head arranged on said chuck body;
a locking sleeve mounted on said chuck body, said locking sleeve being axailly shiftable and having at least limited rotatability with respect to said body, said locking sleeve being formed with axially directed formations engageable with the formations of said control ring for securing said control ring against rotation;
two axial grooves formed in said sleeve and extending adjacent to one another, but of different lengths, at an end of said sleeve turned towards said control ring of receiving said contact head, whereby said lock sleeve can be turned on the chuck body to such an extent that either one or another of said grooves is axially aligned with said at least one contact head;
means for resiliently biasing said lock sleeve in the direction of shifting against said control ring; and
wherein said contact head is elongate in the longitudinal direction of said grooves, and wherein edges of said head form contact surfaces for respective lateral walls of said grooves, said grooves being in communication with one another at said end of said sleeve by means of a transverse connection, said connection having a height, when measured in the longitudinal direction of the grooves, which is less than the axial height of said contact head.

11. The drill chuck defined in claim 10 wherein wall parts positioned on both sides of the transverse connection of both grooves form stops for a respective contact head and limit rotation of the locking sleeve.

12. A drill chuck, comprising:
a chuck body haing an axially extending bore adapted to receive a hank of a drill bit;
a spindle operatively connected to said body for rotating same about an axis of said body;
a plurality of jaws mounted on said body for movement toward and away from said axis for engagement with said shank;
a ring rotatable on said body and operatively connected to said jaws for moving said jaws relative to said axis upon rotation of said ring relative to said jaws;
a locking sleeve surrounding said body, said locking sleeve and said ring having mating formations engageable in a locking position of said sleeve to prevent rotation of said ring, said sleeve being axially retractable from said ring to release said ring for rotation in a retracted position of said sleeve, said sleeve having a pair of axially extending grooves of different lengths opening at an end of said sleeve proximal to said ring and angularly offset from one another about said axis;
a detent head on said body selectively engageable in said grooves in respective angular positions of said sleeve for holding said sleeve in said locking position nd said retracted position; and
a spring bearing axially on said sleeve and yieldably biasing said sleeve toward said ring.

* * * * *